(12) United States Patent
Yacoub

(10) Patent No.: US 8,753,597 B2
(45) Date of Patent: Jun. 17, 2014

(54) VARIABLE EXHAUST GAS AFTERTREATMENT SYSTEM

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/900,431

(22) Filed: May 22, 2013

(65) Prior Publication Data

US 2013/0336862 A1    Dec. 19, 2013

(30) Foreign Application Priority Data

Jun. 15, 2012   (DE) .................. 10 2012 210 115

(51) Int. Cl.
| | | |
|---|---|---|
| *B01D 53/56* | (2006.01) | |
| *B01D 53/78* | (2006.01) | |
| *B01D 53/79* | (2006.01) | |
| *B01D 53/94* | (2006.01) | |
| *F01N 3/18* | (2006.01) | |
| *F01N 3/20* | (2006.01) | |

(52) U.S. Cl.
USPC .............. 423/213.2; 423/239.1; 422/177; 422/180; 60/299; 60/301; 60/274; 60/295

(58) Field of Classification Search
USPC .............. 423/213.2, 239.1; 422/177, 180; 60/299, 301, 274, 295
See application file for complete search history.

(56) References Cited

U.S. PATENT DOCUMENTS

| | | | |
|---|---|---|---|
| 4,084,934 A | 4/1978 | Kumazawa | |
| 6,444,177 B1 | 9/2002 | Muller et al. | |
| 7,166,262 B2 * | 1/2007 | Buzanowski | 423/239.1 |
| 7,571,603 B2 * | 8/2009 | Ripper et al. | 60/286 |
| 7,788,907 B2 | 9/2010 | Koehler et al. | |
| 2009/0092525 A1 | 4/2009 | Ichikawa | |
| 2011/0067381 A1 | 3/2011 | Zimmerman et al. | |
| 2011/0113759 A1 | 5/2011 | Tilinski et al. | |
| 2011/0262329 A1 * | 10/2011 | Ofoli et al. | 423/213.2 |
| 2012/0156105 A1 * | 6/2012 | Maus et al. | 422/168 |

FOREIGN PATENT DOCUMENTS

DE        102008028171 A1    12/2009

OTHER PUBLICATIONS

Jeong, Soo-Jin et al., "Numerical Study of the Optimum Injection of Urea-Water Solution for SCR DeNOx System of a Heavy-Duty Diesel Engine to Improve DeNOx Performance and Reduce NH3 Slip," Environmental Engineering Science, vol. 25, No. 7, pp. 1017-1037, 2008, 20 pages.

Oh, Jungmo et al., "The Spray Characteristics and Spray Behavior Characteristics in Exhaust Gas Flow of Urea Solution Injector," Transactions of the Korean Society of Mechanical Engineers, vol. 34, Issue 11, pp. 999-1004, 2010, 5 pages.

* cited by examiner

*Primary Examiner* — Timothy Vanoy
(74) *Attorney, Agent, or Firm* — Julia Voutyras; Alleman Hall McCoy Russell & Tuttle LLP

(57) ABSTRACT

Systems and method for adjusting a cone angle of injected reductant directed into an engine exhaust upstream of a catalytic device based on the temperature distribution within the catalytic device are disclosed. In one particular example, a dosing unit comprising an adjustable piston is described whose adjustment further controls the distribution and amount of reaction fluid delivered therefrom. In this way, the fluid flow shape may be controlled to achieve a more optimal exhaust gas conversion based on the prevailing conditions within the exhaust gas system.

17 Claims, 4 Drawing Sheets

VARIABLE EXHAUST GAS AFTERTREATMENT SYSTEM

CROSS REFERENCE TO RELATED APPLICATIONS

The present application claims priority to German Patent Application No. 102012210115.2, filed on Jun. 15, 2012, the entire contents of which are hereby incorporated by reference for all purposes.

FIELD

The present description relates to an exhaust gas aftertreatment system and methods for adjusting a flow of reductant therein.

BACKGROUND AND SUMMARY

Exhaust gases generated by an internal combustion engine may be subjected to aftertreatment measures in order to reduce pollutant emissions below predefined limits and adherence to increasingly stringent environmental protection requirements. For example, in applied-ignition engines, use is made of catalytic reactors which, through the use of catalytic materials increase the rate of certain reactions to ensure an oxidation of hydrocarbons (HC) and carbon monoxide (CO). For the oxidation of the unburned hydrocarbons and of carbon monoxide, provision is made in particular of an oxidation catalytic converter in the exhaust-gas flow.

In the case of internal combustion engines operated with an excess of air, for example direct-injection diesel engines or direct-injection applied-ignition engines, the nitrogen oxides (NOx) in the exhaust gas cannot be reduced without the addition of a reducing agent. The reduction of NOx emissions to form nitrogen ($N_2$) and water ($H_2O$) can take place, for example, with an ammonia-containing reducing agent as a reaction fluid on a selectively acting catalytic converter, or selective catalytic reduction (SCR) catalytic converter. Herein, the term "selective" means that the reducing agent introduced reacts preferentially with NOx despite the presence of molecular oxygen and, in some instances, other chemical species (e.g. HC).

The inventor has recognized that adequate exhaust gas conversion may be difficult to attain at low exhaust gas temperatures such as prevail in city traffic. The inventor has solved these problems by developing an exhaust gas aftertreatment system comprising a dosing unit with an adjustable piston whose adjustment further controls the distribution and amount of reaction fluid delivered therefrom. In one particular example, a cone angle of injected reductant directed into an engine exhaust upstream of a catalytic device may be adjusted based on the temperature distribution within the catalytic device. In another example, a method comprising adjusting a feed device located upstream of a catalytic converter responsive to a temperature distribution of a catalytic converter arranged in an exhaust duct to adjust a supply of fluid therefrom, and controlling a distribution and amount of the supplied fluid by adjusting a position and shape of a piston within the feed device is described for adjusting a flow of reductant according to the exhaust gas system of the present disclosure. In this way, the technical result is achieved wherein the fluid flow shape may be controlled to achieve a more optimal exhaust gas conversion based on the conditions prevailing within the exhaust gas system.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The exhaust gas aftertreatment system of the present disclosure may adjust a distribution and amount of reductant flow based on a temperature distribution of the downstream catalytic converter. As such, exemplary embodiments are disclosed that describe the manner in which the distribution and amount of flow are adjusted in response to the temperature distribution. The system is described in detail, with reference to the appended drawings, on the basis of the exemplary embodiments provided.

Figure 1:
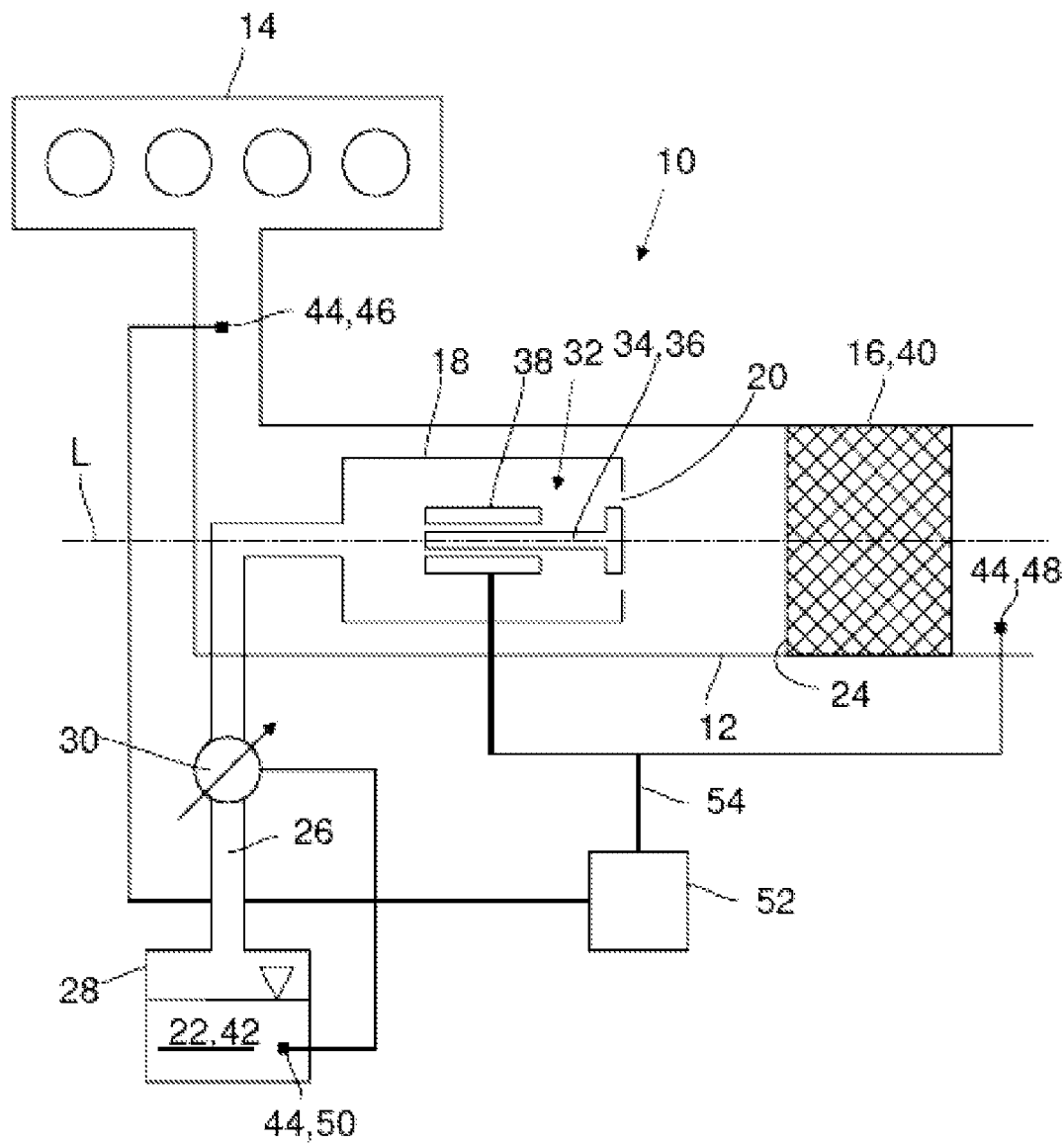
FIG. 1 shows an example exhaust-gas aftertreatment system according to the present disclosure.

FIG. 1 illustrates, by way of a schematic diagram, a first exemplary embodiment of exhaust system 10 according to the present disclosure for the exhaust-gas aftertreatment of exhaust gases. The exhaust system 10 comprises a guide duct 12 which is connected to internal combustion engine 14 that produces the exhaust gases. The exhaust gases are conducted from the internal combustion engine 14 for aftertreatment by a catalytic converter 16 which is likewise arranged in the guide duct 12. Located upstream of the catalytic converter 16 there is arranged a feed device 18 with an exit opening 20 for feeding a fluid into the duct that reacts with the exhaust gases. That is, by means of the feed device a reaction fluid 22 is introduced into guide duct 12 which can react with the exhaust gases. Consequently, both the exhaust gases and the reaction fluid 22 impinge on an inlet end surface 24 of the catalytic converter 16, through which they subsequently enter the catalytic converter 16.

The feed device 18 comprises a line 26 connected to a vessel 28 in which the reaction fluid 22 is stored. In the line 26 there is arranged a delivery device 30 by means of which the reaction fluid 22 can be delivered to exit opening 20. The feed device 18 has a dosing unit 32 by means of which the amount of reaction fluid 22 introduced into guide duct 12 and the distribution of the amount delivered to inlet end surface 24 can be varied, as will be explained in greater detail below. In the example illustrated, dosing unit 32 has an example body 34 formed as a piston 36 that is movable along a longitudinal axis L of feed device 18. A bearing and drive unit 38 is provided therein for mounting and moving piston 36.

With regards to the dosing unit, in one embodiment, the dosing unit has a delivery device for delivering the reaction fluid. The delivery device serves to provide an adequate amount of the reaction fluid such that neither too little nor too much reaction fluid impinges on the catalytic converter. For example, an amount of reaction fluid that is too small results in incomplete conversion, whereas an amount too large leads to slippage of reaction fluid, which thereby flows unchanged through the catalytic converter and may result in an unpleasant smell, in particular, if ammonia ($NH_3$) is used as the reaction fluid. Furthermore, the delivery device can introduce the reaction fluid into the guide duct at high pressure, wherein the higher pressure results in a more finely distributed reaction fluid that may enhance exhaust gas mixing for enhanced NOx conversion.

In the exemplary embodiment of FIG. 1, the exhaust system 10 according to the present disclosure is configured for the reduction of NOx, such as are generated in direct-injection applied-ignition engines or diesel engines. As such, catalytic converter 16 is formed as an SCR catalytic converter 40, and the reaction fluid 22 is a reducing agent 42 such as ammonia or urea.

The exhaust system 10 further comprises a number of sensors 44 by means of which data relating to the exhaust-gas aftertreatment of the exhaust gases can be recorded. Specifically, a first nitrogen oxide sensor 46 and a second nitrogen oxide sensor 48 are arranged in the guide duct 12, wherein the first nitrogen oxide sensor 46 is positioned upstream, and the second nitrogen oxide sensor 48 is positioned downstream, of the SCR catalytic converter 40. NOx sensors 46 and 48 can record the nitrogen oxide concentration at their installation location within guide duct 12. Said sensors may additionally be configured such that the exhaust-gas temperature at the installation location is recorded. Furthermore, there is arranged in vessel 28 a reagent sensor 50 by means of which for example the fill level and/or the temperature of reaction fluid 22 can be determined. Although not shown therein, still other sensors may also be provided, for example a power sensor that determines the power output by internal combustion engine 14. The determined data are such that they can be processed by a control unit 52. The data transmission between the sensors 44 and the control unit 52 may take place via a cable 54 as illustrated, or else may take place wirelessly.

In one configuration, the exhaust system according to the present disclosure comprises a number of sensors which record data relating to the exhaust-gas aftertreatment of exhaust gases, which can be processed by control unit 52. Control unit 52 may be coupled to one or more sensors for processing and recording data relating to the exhaust gases, wherein the control unit further uses measured data to determine a temperature distribution within the catalytic converter and actuates a dosing unit based on the data. As noted above, the sensors may for example determine the power output of the internal combustion engine, which can be assigned to the operating time of the system. From such measurements, for example, by comparison with characteristic maps, it is possible to determine the temperature distribution in the catalytic converter. In turn, information regarding the temperature distribution can be used to actuate the dosing unit for optimal delivery of reductant. Furthermore, temperature sensors may be used to measure the exhaust-gas temperature upstream of the catalytic converter and the temperature of the reaction fluid, and these likewise can provide information that is used to actuate the dosing unit. Furthermore, $NO_x$ sensors may be provided upstream and downstream of the SCR catalytic converter. In this way, it is possible to determine a degree of NOx conversion and thereby regulate the dosing unit with feedback. A further aspect is that the delivery pressure provided by the delivery device can be adapted based on the presently prevailing conditions since the delivery pressure has an effect on the degree of conversion. Therefore, according to the present disclosure, the dosing unit can be adjusted for optimum conversion of exhaust gases based on the presently prevailing conditions.

Controller 52 may be a microcomputer, including a microprocessor unit, input/output ports, an electronic storage medium for storing executable programs and calibration values on a read only memory (ROM) chip, random access memory (RAM), keep alive memory (KAM), and a data bus. Storage medium read-only memory can be programmed with computer readable data representing instructions executable by the processor for performing the methods described herein as well as other variants that are anticipated but not specifically listed. Controller 52 may receive various signals from sensors coupled to exhaust system 10, in addition to those signals previously discussed, including measurement of inducted mass air flow (MAF) from a mass air flow sensor; relative humidity (RH) from humidity sensor; engine coolant temperature (ECT) from temperature sensor coupled to cooling sleeve; a profile ignition pickup signal (PIP) from Hall effect sensor (or other type) coupled to a crankshaft; throttle position (TP) from a throttle position sensor; and absolute manifold air pressure signal (MAP). Engine speed signal, RPM, may be generated by controller 52 from signal PIP. Furthermore, crankshaft position, as well as crankshaft acceleration, and crankshaft oscillations may also be identified based on the signal PIP. Manifold air pressure signal MAP from manifold pressure sensor may be used to provide an indication of vacuum, or pressure, in the intake manifold. Furthermore, as noted herein, manifold pressure may be estimated based on other operating parameters, such as based on MAF and RPM, for example.

The control unit 52 ensures that exhaust system 10 is operated optimally. For this purpose, it evaluates the data collected from various sensors and controls the dosing unit 32, in particular, by controlling the bearing and drive unit 38 in a way which will be explained in more detail with respect to FIGS. 2A-C, which further illustrate exhaust system 10. On the basis of the data collected from the sensors, it is possible for conclusions to be drawn regarding the temperature distribution in catalytic converter 16. Here, for simplicity, schematic illustrations show a temperature gradient that forms perpendicularly to longitudinal axis L.

With respect to FIG. 2A, a first region 56 and a second region 58 are depicted, wherein the first region 56 illustrates a region wherein the temperature is below the light-off temperature and the second region 58 is a region wherein the temperature is above the light-off temperature. Such a temperature distribution may arise, for example, when the power output of internal combustion engine 14 is rapidly reduced. In response, the catalytic converter 16 cools more quickly in the region of the longitudinal axis L than at the circumference.

The exhaust gases produced during engine operation are conducted through guide duct 12, where they impinge on the inlet end surface 24 of catalytic converter 16. Furthermore, the reaction fluid 22 is introduced into guide duct 12 upstream of the catalytic converter 16 by means of feed device 18. The reaction fluid 22 and the exhaust gases mix before they impinge on the inlet end surface 24 of catalytic converter 16. Therefore, a mixer may be optionally included. In catalytic converter 16, the exhaust gases react with the reaction fluid 22 (e.g., urea or ammonia) to form the desired products. In a modern SCR reduction method, ammonia may be used as the reducing agent, wherein direct substances, precursor substances or reversible storage substances may be further used as ammonia carriers. The ammonia direct substances include ammonia gas or aqueous ammonia solutions which are dosed directly into the exhaust-gas flow. Precursor compounds may then release ammonia by way of thermolysis and hydrolysis including urea, ammonium carbamate, cyanuric acid and ammonium formate, which may be used in the solid form in some cases, and in the form of aqueous solutions in other cases, wherein both forms are common in the case of urea. For example, in the SCR catalytic converter 40, NOx is converted, with ammonia as reaction fluid 22 and oxygen, to form elementary nitrogen and water, which then exit guide duct 12 downstream of the SCR catalytic converter 40 for discharge to the atmosphere. The above-listed substances are non-limiting and provided for example. In particular, the substances do not constitute an exhaustive list of reaction fluids.

To realize an adequate conversion, a certain operating temperature of the exhaust-gas aftertreatment system is required. The so-called light-off temperature of the catalytic converter may be 120° C. to 250° C. The operating temperature may be determined inter alia by the exhaust-gas temperature and temperature of the reaction fluid. The exhaust-gas temperature may in turn depend inter alia on the power output of the internal combustion engine. To ensure that conversion does not decrease by too great an extent at low exhaust-gas temperatures, reaction fluids, or reducing agents, may be stored within the SCR catalytic converter. Thereby, use is made for example of $NH_3$ storage substances that reversibly bond ammonia as a function of temperature. For instance, particular metal amine stores are known, e.g. $MgCl_2$, $CaCl_2$ and $SrCl_2$, which store ammonia as a complex compound in the form of $MgCl_2(NH_3)_x$, $CaCl_2(NH_3)_x$ or $SrCl_2(NH_3)_x$, respectively. The complexed ammonia can then be released from said compounds via the supply of heat.

In one embodiment, the catalytic converter is formed as an SCR catalytic converter for the selective catalytic reduction of exhaust gas using the reaction fluid as a reducing agent. However, the temperature of the SCR catalytic converter may be used to increase the degree of conversion of NOx. Furthermore, direct-injection applied-ignition engines and diesel engines are characterized by low fuel consumption, which leads to resource-conserving use of mineral oil reserves and contributes to the reduction of $CO_2$ emissions. Consequently, there is particular interest in reducing the NOx emissions and $CO_2$ output. In this embodiment, the NOx emissions are reduced substantially.

To ensure adequate mixing between the exhaust gas and the reducing agent, the reducing agent may evaporate regardless of whether it is stored in the catalytic converter or added upstream of the catalytic converter. As such, adequate mixing, and consequently adequate conversion, is attained at approximately 120 to 170° C. In the case of diesel engines, the exhaust-gas temperature in city traffic may however seldom exceed 100° C. Therefore, despite the countermeasures briefly mentioned above, other measures are needed to attain optimal exhaust conversion.

In view of the above, the feed device described herein comprises a dosing unit for controlling the distribution and amount of reaction fluid impinging on the inlet end surface of catalytic converter 16. The reaction fluid can be introduced into the guide duct in such a way that it impinges on the inlet end surface primarily in those regions in which the catalytic converter is at a higher temperature. For example, the inlet end surface of the catalytic converter is often circular with a non-uniform temperature distribution. In addition, the temperature distribution may depend on the power output of the internal combustion engine such that the prevailing temperature around the central point of the end surface is different than that at the circumference, or peripheral part of the end surface. For simplicity, the temperature profiles shown herein extend along the length of the catalytic converter.

Alternatively, when an internal combustion engine has just been started, the catalytic converter heats up in the center initially, whereas the temperature at the circumference increases more slowly. Therefore, by means of the dosing unit according to the present disclosure, it is possible for the reaction fluid to be supplied into the feed duct such that the greatest amount impinges on the center portion of the inlet end surface, where the catalytic converter is at a relatively high temperature. In this way, the majority of the reaction fluid is converted during the reaction with exhaust gas, and optimal conversion is attained for the prevailing conditions. Furthermore, slippage of the reaction fluid, which refers to the passage of reaction fluid through the catalytic converter without it having reacted with the exhaust gas, is substantially prevented.

Figure 2A:
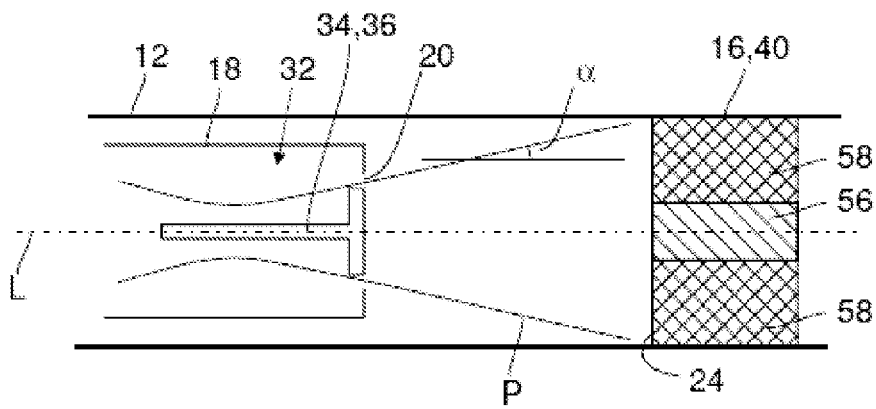
FIGS. 2A-C show various operating states of the exhaust-gas aftertreatment system of FIG. 1 based on piston location.
Figure 2B:
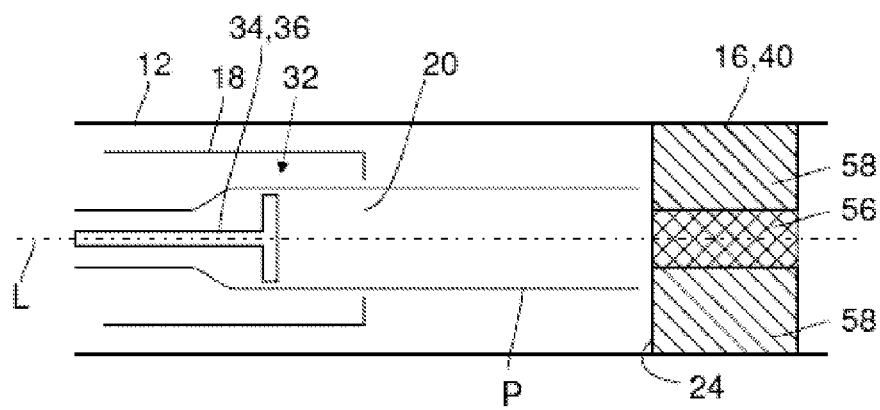
Figure 2C:
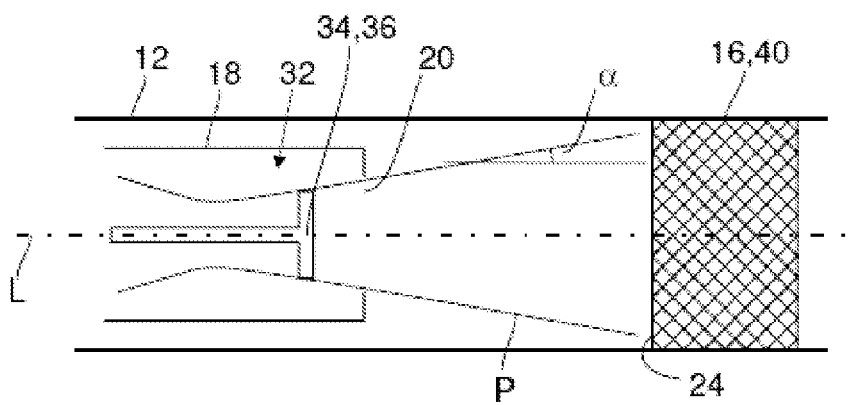

In FIGS. 2A-C, example flow paths followed by the majority of the reaction fluid 22 between the exit opening 20 and the inlet end side are illustrated approximately by a line denoted by P. In the case of a rotationally symmetric construction of exhaust system 10, the lines may form a truncated cone in one embodiment wherein the majority of the reaction fluid 22 flows between feed device 18 and the inlet end surface 24 of the catalytic converter 16. In another embodiment, the flow may form a cylindrical shape.

In the event of a sudden decrease in power output, the catalytic converter may cool to a greater extent around the central point of the inlet end surface or along the longitudinal axis than at the peripheral circumference. Consequently, FIG. 2A shows that the dosing unit may be adjusted such that the reaction fluid impinges on the inlet end surface in the outer region near the periphery, where the temperature of the catalytic converter is adequately high. Although the shape is described as a truncated cone for simplicity, in some instances, a portion of the fluid flow may also exist outside of the truncated cone. However, the shape may still be described as a truncated cone. Furthermore, an exit angle α is shown relative to the lateral surface of the truncated cone at which the majority of the reaction fluid 22 leaves the exit opening 20. Said exit angle describes the angle relative to the longitudinal axis L at which the majority of the reaction fluid 22 exits dosing unit 32. As shown in the example of FIG. 2A, in some embodiments, dosing unit 32 is operated such that an exit angle α is set at which the reaction fluid 22 impinges on the inlet end surface 24 primarily in the relatively warm second region 58 of catalytic converter 16, where the second region 58 is at a temperature above the light-off temperature. Conversion takes place to a greater extent in second region 58 compared to the relatively cold first region 56. For this purpose, the piston 36 extends as far as the exit opening 20. In addition, a shadow region may be generated directly downstream of piston 36 in the vicinity of the longitudinal axis L, in which shadow region only a small amount of reaction fluid 22 is situated. In some instances, the shadow region may extend as far as inlet end surface 24 so that only a very small amount of reaction fluid 22 and exhaust gas impinges on the cold first region 56.

By contrast, FIG. 2B illustrates an embodiment wherein catalytic converter 16 is at a higher temperature in first region 56 than in second region 58. Such a temperature distribution may arise when the internal combustion engine 14 has just been started up. In this case, the catalytic converter 16 may warm up radially from the inside outward. To ensure that the reaction fluid 22 impinges on the inlet end surface 24 substantially in the relatively warm first region 56, the dosing unit 32 may be operated so as to yield a small exit angle α. Therefore, in FIG. 2B, said exit angle α is shown substantially equal to zero such that the majority of the reaction fluid 22 is situated within a cylinder rather than a truncated cone. Consequently, only a small portion of reaction fluid 22 impinges on the relatively cold second region.

FIG. 2C illustrates another example wherein catalytic converter 16 is at a temperature above the light-off temperature over the entire inlet end surface 24. As such, a temperature difference between the first and second regions is not present. Such a state arises after a long period of continuous operation of the internal combustion engine 14. In continuous operation, that is to say when the power output of the internal combustion engine does not substantially vary over a relatively long period of time, for example, during freeway driving, the temperature gradient across the inlet end surface of the catalytic converter may be reduced. As such, a temperature hot enough for conversion prevails throughout. Consequently, the entire catalytic converter 16 is available for adequate conversion, and a larger exit angle α than in FIG. 2A can be set. For this purpose, piston 36 is positioned slightly further toward the exit opening 20 in relation to the state shown in FIG. 2B, but not as far as that shown in FIG. 2A. The result of this intermediate piston placement relative to the examples shown in FIGS. 2A-B is that the shadow region does not extend all the way to catalytic converter 16, and therefore reaction fluid 22 and the exhaust gas may impinge uniformly over the entire inlet end surface 24. This is advantageous because, during operation of the catalytic converter, deposits can form which reduce the functionality of the catalytic converter, which deposits can be burnt off in a regeneration process. If the reaction fluid is applied uniformly to the inlet end surface, the formation of too thick a layer is prevented which cannot be completely removed in the regeneration process. Consequently, the catalytic converter may operate at a higher efficiency.

The reaction fluid is introduced into the guide duct either in gaseous form or in finely atomized form. In one advantageous embodiment, the dosing unit has a body that is variable in terms of its position and/or shape, which may be adjusted to change an exit angle at which the reaction fluid exits the dosing unit. Consequently, the flow conditions in the feed device determine the exit angle at which the reaction fluid exits the dosing unit, and the way in which the reaction fluid with the exhaust gas impinges on the inlet end surface. The flow conditions and exit angle can therefore be varied in a targeted manner by means of the variable body. Because the dosing unit has an exit opening through which the reaction fluid exits, the body can project beyond the exit opening into the feed duct and thereby open up an annular gap in some embodiments. Said body may however also be positioned entirely within the dosing unit and have a certain spacing to the exit opening such that said body does not extend through the exit opening. In this manner, the flow conditions may be changed depending on the position of the body, which has an influence on the exit angle and the region in which the reaction fluid impinges on the inlet end surface in the manner already described. The flow conditions can however be further influenced by means of a change in the shape of the body and thus by means of a change in the flow resistance, whereby it is also possible for the exit angle and distribution of the amount of reaction fluid impinging on the inlet end surface to be controlled. In the example described herein, the body is shown formed as a piston movable along a longitudinal axis of the feed device, which is a structurally simple device to produce. Therefore, the drive unit for operating the piston is not very complex and can be hydraulically or pneumatically operated, whereby it operates very reliably.

In a second embodiment, piston 36 has extendable flow flaps for changing the flow resistance of the piston body and the exit angle. Said flow flaps can be adjusted in a continuously variable fashion between two end positions. In this way, the extendable flow flaps are similar to an umbrella since a minimum flow resistance is provided in a first end position and a maximum flow resistance is provided in a second end position. Because the flow resistance also has an influence on the exit angle, the region within which the reaction fluid impinges on the inlet end surface can thus be changed in a structurally reliable manner.

Figure 3A:
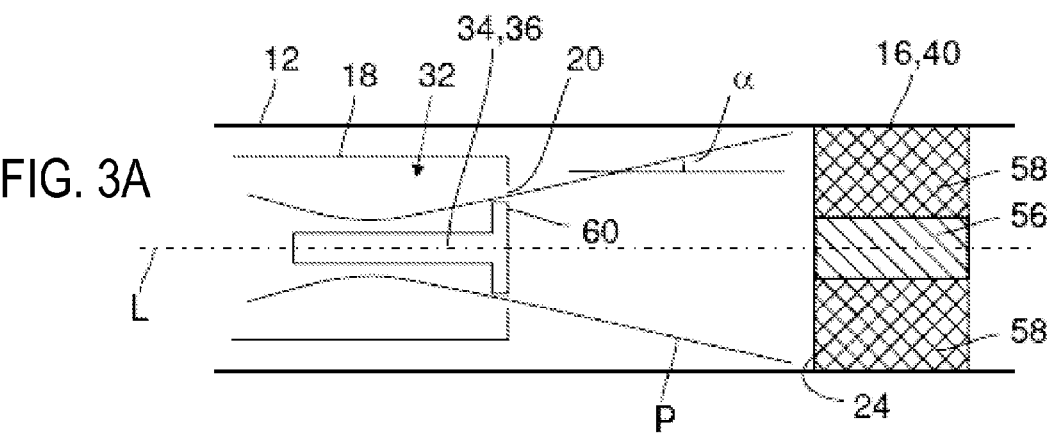
FIGS. 3A-B show two different exemplary operating states of the exhaust-gas aftertreatment system of FIG. 2A based on extendable flow flaps.
Figure 3B:
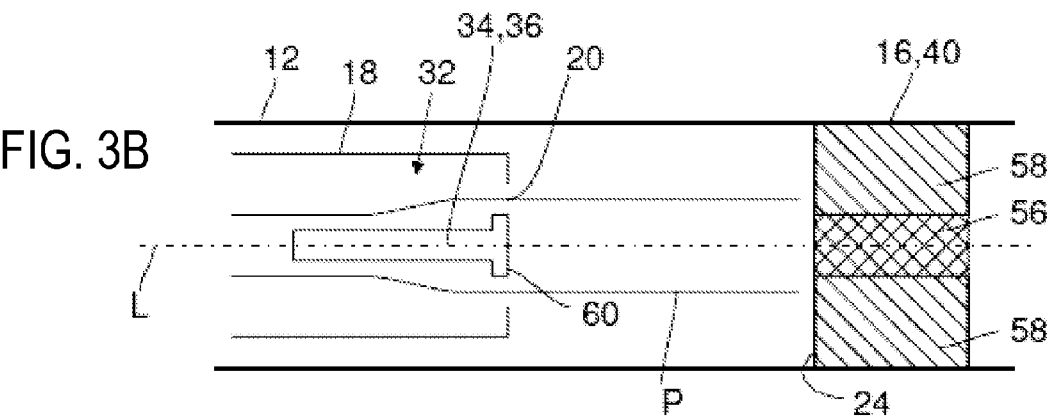

In FIGS. 3A and 3B two examples of the second embodiment of dosing unit 32 are shown. By contrast to the first embodiment, the dosing unit 32 of the second body has a body 34 which is not movable in terms of its position but which can change its shape, for which purpose it has extendable flow flaps 60. Although example configurations of the position and shape are shown operating individually herein for simplicity, in some embodiments, the two variables may be adjusted together to change the distribution and amount of fluid flow. The flow flaps 60 are extended further in FIG. 3A than in FIG. 3B, whereby the exit angle α is likewise changed in response to the length of the extendable flow flaps that are schematically illustrated therein. In this way, the distribution of the fluid flow may be changed in a manner similar to the distributions describe above with respect to FIGS. 2A-C.

Figure 4:
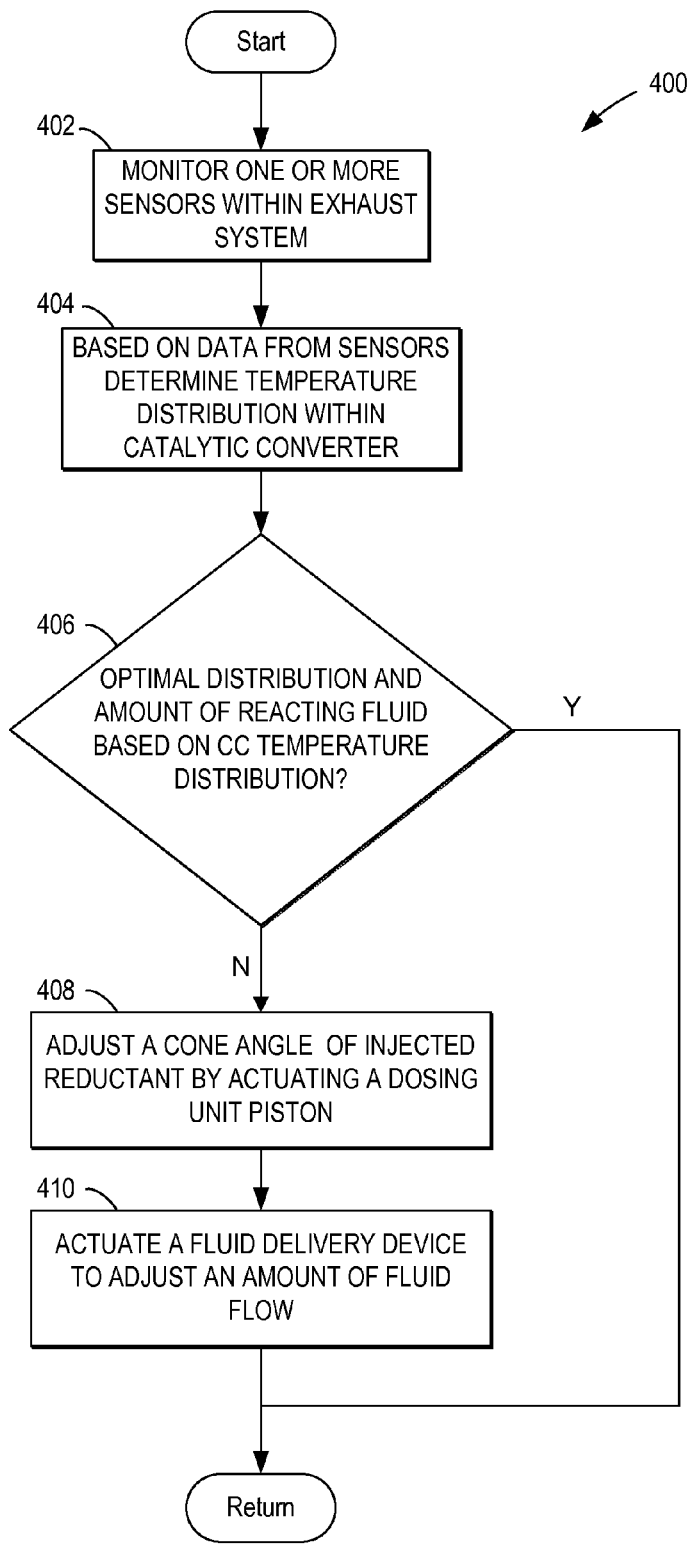
FIG. 4 is an example flow chart for adjusting a reductant flow based on a catalytic converter temperature distribution.

Turning to control of the method, FIG. 4 shows an example flow chart of method 400 for adjusting a reaction fluid flow based on a catalytic converter temperature distribution. In general, the exhaust-gas system may conduct the exhaust gases from the internal combustion engine through the apparatus by means of guide duct 12, wherein the exhaust gases are subjected to aftertreatment by means of a catalytic converter arranged therein. As described above, the catalytic converter has an inlet end surface against which the exhaust gases impinge as they flow and through which the exhaust gases enter the catalytic converter. In addition, a reaction fluid may be supplied for reaction with the exhaust gases in the guide duct upstream of the catalytic converter by means of the included feed device. Although the system is described herein for reduction of NOx using a reductant, in some embodiments, the reaction fluid may also be an oxidant, for example, to oxidize unburned hydrocarbons. Reaction fluid delivered from the feed device further impinges on the inlet end surface of the catalytic converter and subsequently enters the catalytic converter along with the exhaust gases. Thereby, the method includes controlling the distribution of the amount of reaction fluid impinging on the inlet end surface by means of a dosing unit arranged in the feed device upstream of the catalytic converter.

At 402, method 400 includes monitoring sensors within exhaust system 10. The exhaust system according to the present disclosure comprises a number of sensors for detecting and recording various data related to the exhaust-gas aftertreatment of exhaust gases. For example, temperature sensors may be used to measure the exhaust-gas temperature upstream of the catalytic converter and the temperature of the reaction fluid, which can provide information for actuating the dosing unit. Furthermore, in some embodiments, $NO_x$ sensors may be provided upstream and downstream of the SCR catalytic converter. In this way, it is possible to determine a degree of NOx conversion and thereby regulate the dosing unit with feedback. Although NOx sensors are shown upstream and downstream of the catalyst, in some embodiments, the upstream and/or downstream NOx sensor may be omitted, for example, because the NOx concentration is estimated using a model and data from one or more other sensors.

Based on data from one or more sensors within exhaust system 10, at 404, method 400 includes determining the temperature distribution within the catalytic converter. For example, sensor data may be collected and processed by control unit 52, which further actuates a dosing unit based on the data collected. As noted already, such measurements may be compared with characteristic maps or processed by control unit 52 (e.g., based on a model) to determine the temperature distribution of the catalytic converter.

At 406, method 400 further includes determining whether the distribution and amount of reacting fluid delivered from the feed device are operating optimally based on the temperature distribution of the catalytic converter and/or operating conditions. If control unit 52 determines that fluid flow is not producing an optimal flow based on the temperature distribution of the catalytic converter, then it may use the information regarding the temperature distribution to actuate the dosing unit for optimal delivery of reductant. Alternatively, if control unit 52 determines that feed device 18 is delivering a substantially optimized flow based on the conditions there, the method may end while control unit 52 continues monitoring conditions within the exhaust gas system.

Returning to actuation of the of the feed device, if control unit 52 determines that adjustments are to be made based on sensor data, then at 408, method 400 includes adjusting a cone angle of injected fluid by actuating a dosing unit piston. As described already, the position and shape of the piston may be changed to adjust the cone angle and/or shape of the reaction fluid delivered to catalytic converter 16. For example, in one embodiment, the position of the piston may be reduced relative to exit opening 20 to increase the exit angle of the fluid therefrom. Alternatively, piston position may be increased relative to exit opening 20 to reduce the exit angle (e.g., to substantially 0 degrees). A flow of fluid having a larger exit angle produces a truncated cone flow shape whereas a flow of fluid with a smaller exit angle produces a more cylindrical flow shape that impinges the inlet end surface 24 near the central region in the vicinity of the longitudinal axis. Furthermore, as the piston position is reduced relative to the exit opening, a shadow region may be generated directly downstream of piston 36 in the vicinity of the longitudinal axis L. Therefore, based on the placement of the piston within the dosing unit, the shadow region may be controlled and, in some instances, extend as far as inlet end surface 24 so that only a very small amount of reaction fluid 22 and exhaust gas impinges on the centralized region. As such, the fluid flow shape may be adjusted from a substantially hollow truncated cone (e.g., for a non-uniform temperature distribution with a cold central region along the longitudinal axis) to a substantially solid truncated cone (e.g., for a uniform temperature distribution), to a cylinder (e.g., for a non-uniform temperature distribution with a hot central region along the longitudinal axis).

Alternatively, in a second embodiment, piston shape may also be adjusted by adjusting the length of extendable flow flaps 60. For example, the length of extendable flow flaps 60 may be increased to increase the exit angle of the fluid whereas the length may be decreased to decrease the exit angle of the fluid flow. As described already, the extendable flow flaps may be adjusted to change the flow resistance of the piston body in order to adjust the exit angle. As described herein, the flow flaps are continuously adjustable between two end positions. However, other configurations are possible and have been contemplated. Although the piston position and length of extendable flow flaps are shown individually adjustable for simplicity herein, in some embodiments (not shown), the two variables may be synchronously adjusted to adjust a flow of fluid from the feed device. That is, control unit 52 may adjust a cone angle by adjusting both the piston position and flow flap length simultaneously.

To adjust the amount of fluid delivered from the feed device, at 410, method 400 includes actuating a fluid delivery device to adjust the amount of fluid delivered. As described herein, the flow of reaction fluid from vessel 28 may be increased by actuating the delivery device, for example, by opening a valve attached thereto, in order to increase the amount of fluid injection. Alternatively, the flow of fluid from vessel 28 may be decreased in order to reduce the amount of reaction fluid injected. A further aspect is that the delivery pressure provided by the delivery device can be adapted based on the presently prevailing conditions since the delivery pressure has an effect on the degree of exhaust gas conversion. Therefore, according to the present disclosure, the dosing unit can be adjusted for optimum conversion of exhaust gases based on the presently prevailing conditions.

This concludes the Detailed Description, the reading of which provides advantageous methods for enhancing exhaust gas aftertreatment, especially at low temperatures. The methods described offer advantages for enhancing exhaust gas aftertreatment by adjusting a cone angle of injected reaction fluid directed into an engine exhaust upstream of a catalytic device based on a temperature distribution within the catalytic device. In particular, the fluid flow may be controlled to achieve a more optimal exhaust gas conversion based on the conditions prevailing within the exhaust gas system. As such, advantages are offered since the flow of fluid may be directed to the catalytic converter based on the temperature distribution therein in order to increase the operating efficiency of the exhaust gas system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system, comprising:
   a duct for conducting exhaust gases out of an engine,
   a catalytic converter with an inlet end surface against which the exhaust gases impinge as they flow,
   a feed device upstream of the catalytic converter for feeding a fluid into the duct that reacts with the exhaust gases, wherein
   the feed device has a dosing unit for controlling a distribution and amount of reaction fluid delivered therefrom, and the dosing unit has a variable body that includes an adjustable piston that moves along a longitudinal axis of the feed device.

2. The exhaust system of claim 1, wherein a position and shape of the adjustable piston are changed to change an exit angle at which the reaction fluid exits the dosing unit.

3. The exhaust system of claim 2, wherein the adjustable piston has extendable flow flaps for changing the exit angle at which the reaction fluid exits the dosing unit.

4. The exhaust system of claim 3, wherein the catalytic converter is a selective catalytic reduction device and the reaction fluid is a reducing agent.

5. The exhaust system of claim 4, further including a control unit coupled to one or more sensors for processing and recording data relating to the exhaust gases, wherein the control unit further actuates the dosing unit based on the data.

6. The exhaust system of claim 5, wherein the control unit uses measured data to determine a temperature distribution within the catalytic converter.

7. The exhaust system of claim 6, wherein the distribution and amount of reaction fluid delivered by the feed device is adjusted based on the temperature distribution within the catalytic converter.

8. The exhaust system of claim 1, wherein the dosing unit includes a delivery device for delivering a known amount of reaction fluid.

9. An exhaust gas aftertreatment method, comprising:
   adjusting a feed device located upstream of a catalytic converter responsive to a temperature distribution of a catalytic converter arranged in an exhaust duct to adjust a supply of fluid therefrom, and
   controlling a distribution and amount of the supplied fluid by adjusting a position and shape of a piston within the feed device.

10. The exhaust gas aftertreatment method of claim 9, wherein the piston changes position by moving along a longitudinal axis of the feed device and further changes shape by adjusting extendable flow flaps to change an exit angle at which the fluid exits the feed device.

11. The exhaust gas aftertreatment method of claim 10, wherein fluid exiting the feed device at an exit angle near zero degrees relative to the longitudinal axis of the feed device forms a substantially cylindrical flow that impinges on a center region of an inlet end surface of the catalytic converter.

12. The exhaust gas aftertreatment method of claim 11, wherein a control unit coupled to one or more sensors in the exhaust duct is programmed with executable instructions for actuating the fluid supplied based on data collected therein.

13. The exhaust gas aftertreatment method of claim 10, wherein fluid exiting the feed device at an exit angle substantially different than zero degrees relative to the longitudinal axis of the feed device forms a substantially truncated cone shape that impinges on substantially all of an inlet end surface of the catalytic converter.

14. The exhaust gas aftertreatment method of claim 13, wherein the fluid exiting the feed device with the substantially truncated cone shape further comprises a shadow region in a vicinity of the longitudinal axis directly downstream of the piston such that the fluid impinges on a peripheral region of the inlet end surface of the catalytic converter.

15. The exhaust gas aftertreatment method of claim 14, wherein the shadow region extends to the inlet end surface of the catalytic converter.

16. The exhaust gas aftertreatment method of claim 9, wherein the feed device further includes a delivery device for controlling the amount of fluid supplied.

17. A method, comprising:
   adjusting a cone angle of injected reductant directed into an engine exhaust upstream of a SCR catalyst, wherein the engine exhaust is conducted via a duct from an engine to the SCR catalyst having an inlet end surface against which the exhaust impinges, and wherein the reductant is supplied via a feed device upstream of the SCR catalyst and the reductant includes urea; and
   adjusting an amount of injected reductant responsive to catalyst temperature, wherein the adjusting of the cone angle is further responsive to the catalyst temperature and operating conditions.

* * * * *